US011339877B2

(12) United States Patent
Deperraz et al.

(10) Patent No.: US 11,339,877 B2
(45) Date of Patent: May 24, 2022

(54) VALVE ASSEMBLY

(71) Applicant: FAS MEDIC S.A., Palezieux (CH)

(72) Inventors: Nicolas Deperraz, Bons en Chablais (FR); Vincent Tanari, Satigny (CH); Pauline Labory, St Jean de Gonville (FR)

(73) Assignee: FAS MEDIC S.A., Palézieux (CH)

( * ) Notice: Subject to any disclaimer, the term of this patent is extended or adjusted under 35 U.S.C. 154(b) by 12 days.

(21) Appl. No.: 16/414,452

(22) Filed: May 16, 2019

(65) Prior Publication Data
US 2019/0353254 A1 Nov. 21, 2019

(30) Foreign Application Priority Data

May 18, 2018 (EP) ..................................... 18173331

(51) Int. Cl.
*F16K 39/02* (2006.01)
*F16K 1/44* (2006.01)
(Continued)

(52) U.S. Cl.
CPC .............. *F16K 1/44* (2013.01); *F16K 11/044* (2013.01); *F16K 31/0655* (2013.01);
(Continued)

(58) Field of Classification Search
CPC .............. F16K 39/022; F16K 31/0693; F16K 31/0675; F16K 31/0655; F16K 39/02;
(Continued)

(56) References Cited

U.S. PATENT DOCUMENTS

| 2,709,451 A * | 5/1955 | La Bour ............... F16K 39/022 |
| | | 137/625.35 |
| 3,219,063 A * | 11/1965 | Schumann ............... F16K 1/42 |
| | | 137/625.33 |

(Continued)

FOREIGN PATENT DOCUMENTS

| DE | 10319920 A1 | 5/2004 |
| DE | 102006006883 A1 | 8/2007 |

OTHER PUBLICATIONS

International Search Report dated Jun. 7, 2019 for PCT Patent Application No. PCT/EP2019/062894.

(Continued)

*Primary Examiner* — Matthew W Jellett
*Assistant Examiner* — Christopher D Ballman
(74) *Attorney, Agent, or Firm* — Young Basile Hanlon & MacFarlane, P.C.

(57) ABSTRACT

A valve assembly, comprising a first fluid port, a second fluid port, a valve seat comprising an inner valve seat and an outer valve seat, and a moveable plunger, being moveable between a closed position and an open position arranged to simultaneously seal the inner valve seat and the outer valve seat when in the closed position. A first fluid pathway passes via the inner valve seat, and a second fluid pathway passes via the outer valve seat between the first and second fluid ports when the movable plunger is in the open position. At least one fluid flow path is provided through the body of the moveable plunger. The cross-sectional area of the flow path through the moveable plunger is at least half of the cylindrical cross-sectional area of the gap between the plunger and the respective inner or outer valve seat.

16 Claims, 8 Drawing Sheets

(51) Int. Cl.
*F16K 31/06* (2006.01)
*F16K 11/044* (2006.01)
*F16K 1/36* (2006.01)
*F16K 31/08* (2006.01)

(52) U.S. Cl.
CPC ............... *F16K 39/02* (2013.01); *F16K 1/36* (2013.01); *F16K 31/0624* (2013.01); *F16K 31/0627* (2013.01); *F16K 31/0675* (2013.01); *F16K 31/0693* (2013.01); *F16K 31/082* (2013.01); *F16K 39/022* (2013.01)

(58) Field of Classification Search
CPC ...... F16K 31/082; F16K 1/36; F16K 31/0624; F16K 1/44
See application file for complete search history.

(56) References Cited

U.S. PATENT DOCUMENTS

| | | | | |
|---|---|---|---|---|
| 4,300,595 A | * | 11/1981 | Mayer | F16K 1/34 137/625.33 |
| 4,383,234 A | * | 5/1983 | Yatsushiro | F16K 31/082 335/230 |
| 4,514,710 A | * | 4/1985 | Conrad | F16K 39/022 251/129.1 |
| 4,782,862 A | * | 11/1988 | Nguyen | F16K 31/0693 137/630.14 |
| 4,953,825 A | * | 9/1990 | Osumi | F16K 31/0658 251/129.07 |
| 5,265,643 A | * | 11/1993 | Golestan | G05D 7/0133 137/504 |
| 5,398,724 A | * | 3/1995 | Vars | F02M 21/0272 137/625.33 |
| 5,524,865 A | * | 6/1996 | Uchisawa | F16K 7/14 251/331 |
| 5,582,208 A | | 12/1996 | Suzuki | |
| 5,927,331 A | * | 7/1999 | Suzuki | F16K 1/34 137/625.33 |
| 5,975,654 A | * | 11/1999 | Zaviska | B60T 8/363 137/599.16 |
| 6,220,277 B1 | * | 4/2001 | Blain | F16K 31/0693 137/271 |
| 6,357,677 B1 | * | 3/2002 | Ren | F02M 51/0675 239/585.4 |
| 6,382,587 B1 | * | 5/2002 | Rabe | F02D 9/12 251/318 |
| 6,526,951 B2 | * | 3/2003 | Ishigaki | B60K 15/03504 123/519 |
| 6,570,820 B2 | * | 5/2003 | Patel | F16K 31/0693 367/144 |
| 6,619,322 B1 | * | 9/2003 | Wojciechowski | F16K 25/00 137/625.33 |
| 6,682,316 B1 | * | 1/2004 | Boke | B67D 7/36 251/30.04 |
| 6,832,748 B2 | * | 12/2004 | Carroll, III | F16K 31/0693 251/129.07 |
| 6,871,803 B1 | * | 3/2005 | Ohmi | H04W 74/006 239/596 |
| 6,920,895 B2 | * | 7/2005 | Avis | F16K 17/30 137/462 |
| 7,077,378 B2 | * | 7/2006 | Rampen | F16K 15/08 251/129.15 |
| 7,118,088 B2 | * | 10/2006 | Hirota | F25B 41/062 251/129.19 |
| 7,140,386 B2 | | 11/2006 | Avis et al. | |
| 7,219,690 B2 | * | 5/2007 | McDonald | F16K 17/30 137/512.1 |
| 7,270,310 B2 | | 9/2007 | Takakura | |
| 7,591,281 B2 | * | 9/2009 | Tsuge | F16K 41/10 137/495 |
| 7,857,282 B2 | * | 12/2010 | Goossens | F16K 31/0655 251/129.07 |
| 8,186,377 B2 | * | 5/2012 | Ishitoya | F16K 25/005 137/516.29 |
| 8,616,523 B2 | | 12/2013 | Duerr et al. | |
| 9,285,054 B2 | * | 3/2016 | Matsumoto | F16K 39/022 |
| 9,360,127 B2 | * | 6/2016 | Helmsen | F16K 1/36 |
| 9,720,420 B2 | * | 8/2017 | Uchida | F16K 31/0693 |
| 9,739,382 B2 | * | 8/2017 | Laird | F16K 31/0624 |
| 9,803,635 B2 | * | 10/2017 | Kato | F16K 1/32 |
| 9,897,221 B2 | * | 2/2018 | Terashima | F02M 21/0266 |
| 9,914,353 B2 | * | 3/2018 | Walter | F16K 31/06 |
| 10,161,395 B2 | * | 12/2018 | Vadasz | F04B 53/128 |
| 10,253,682 B2 | * | 4/2019 | Lenk | F16K 31/0693 |
| 10,641,397 B2 | * | 5/2020 | Bjerrehorn | F16K 31/0658 |
| 2005/0217734 A1 | * | 10/2005 | Takakura | F16K 24/04 137/587 |
| 2011/0175004 A1 | * | 7/2011 | Duerr | F16K 31/0655 251/129.01 |
| 2013/0112904 A1 | | 5/2013 | Tanari | |
| 2013/0205986 A1 | * | 8/2013 | Rampen | F16K 1/34 91/418 |
| 2015/0337972 A1 | * | 11/2015 | Hayasaka | F16K 11/24 137/625.33 |
| 2016/0279376 A1 | * | 9/2016 | Cewers | A61M 16/0858 |
| 2017/0130861 A1 | * | 5/2017 | Deperraz | F16K 1/54 |
| 2018/0128382 A1 | | 5/2018 | Bjerrehorn | |

OTHER PUBLICATIONS

European Search Report dated Nov. 23, 2018 for Patent Application No. EP 18 17 3331.2.

* cited by examiner

VALVE ASSEMBLY

FIELD OF THE INVENTION

The present invention relates to a valve assembly and, in particular, to a microfluidic valve assembly having an improved flow characteristic.

BACKGROUND TO THE INVENTION

Fluid control valves are used in a wide variety of applications to control the flow of a fluid. The fluid being controlled may comprise a gas, a liquid, or a combination thereof. In some situations, the fluid may also include suspended particulates. While fluid control valves vary widely in the specific configuration used to open and close a fluid communication path through the valve, one specific type of valve actuation is performed using a solenoid.

In solenoid-actuated valves, an electric current passes through an electromagnetic coil, with the coil typically formed around a magnetic core. The coil generally comprises a wire that is wrapped around a bobbin numerous times resulting in a plurality of so-called turns. The energized solenoid generates a magnetic field. The strength of the magnetic field is proportional to the number of turns as well as the electrical current provided to the wire.

As is well-known in the art, in order to increase the magnetic field provided by a solenoid, the number of turns can be increased and/or the current provided to the wire can be increased. The magnetic field typically operates on a movable armature connected to a plunger which is configured to engage a valve seat, which surrounds an inlet and/or outlet through which fluid may pass, to vary a flow restriction created by the valve seat and a sealing portion of the plunger.

Typically, the valve also includes a spring or other biasing member that generates a biasing force in opposition to the magnetic field. Therefore, in the absence of a magnetic field generated by the solenoid, the valve member is moved into a normally open or a normally closed position. In an open position, the plunger is in a position away from the valve seat, allowing fluid to pass through the inlet and/or outlet. In a closed position, the sealing portion of the plunger abuts the valve seat so as to close the inlet and/or outlet, preventing fluid from passing through the inlet and/or outlet.

When the valve assembly is required to be small and light, it is important to control the flow characteristics of the valve, for example, to achieve a sufficiently high flow rate. However, there are challenges in achieving this when increases in the plunger stroke length and cross-sectional area of the valve seat may be restricted in a small valve assembly. Particularly in small valves, the lack of space available within the body of the valve may force the design of complicated and/or additional valve parts and create tortuous flow paths with many direction changes and flow restrictions, etc. The consequences of this are an increase of the cost of the valve, a decrease of the manufacturability of the valve and rather unpredictable flow capabilities.

There is therefore a need for improvements in valve assemblies.

SUMMARY OF THE INVENTION

The present inventors have recognised that improved valve assemblies having better control over the volume of fluid that passes between the inlet and the outlet when the plunger is in an open position are required. In particular, they have recognised that by introducing a fluid flow path in a moveable plunger of a valve assembly, a dual fluid pathway can be provided, in that fluid may flow between two fluid ports of the valve assembly via two flow paths, i.e. a first flow path directly between the two fluid ports and a second flow path through the plunger. The result is that a higher flow rate may be achieved for a given valve assembly size, and the proportion of fluid passing through each flow path may be optimised for a particular application.

Thus, according to a first aspect of the invention, there is provided a valve assembly, comprising: a first fluid port; a second fluid port; a valve seat comprising an inner valve seat and an outer valve seat, the inner valve seat being arranged within the outer valve seat; a moveable plunger having a body and being moveable between a closed position and an open position to vary a flow restriction at the valve seat and arranged to simultaneously seal the inner valve seat and the outer valve seat when in the closed position; a first fluid pathway between the first fluid port and the second fluid port passing via the inner valve seat when the movable plunger is in the open position; a second fluid pathway between the first fluid port and the second fluid port passing via the outer valve seat when the movable plunger is in the open position; and at least one fluid flow path through the body of the moveable plunger comprising an opening configured to form part of the first fluid pathway or the second fluid pathway, and wherein the cross-sectional area of the flow path through the moveable plunger is at least half of the cross-sectional area of the gap between the plunger and the respective inner or outer valve seat of the first or second fluid pathway of which the opening forms a flow path when the movable plunger is in the open position.

The at least one fluid flow path through the body of the moveable plunger allows for improved flow characteristics of the valve assembly in terms of increased flow for a given plunger stroke length and a given cross-sectional area of the valve seat, less flow resistance and less turbulence. This is particularly advantageous for small valves, for example, having dimensions of the order $10^{-2}$ m (e.g. around 10 mm) and cross-sectional areas of the valve seat of the order $10^{-5}$ $m^2$, for which the plunger stroke length may typically be of the magnitude $10^{-4}$ m.

Alternatively, for a given flow requirement, the at least one fluid flow path through the body of the moveable plunger advantageously permits a smaller plunger stroke length for a given cross-sectional area of the valve seat.

Moreover, the at least one fluid flow path through the body of the moveable plunger allows for decreased pressure within the valve assembly or increased back pressure sensitivity for the same flow rate.

The metric of the cross-sectional area of the flow path through the moveable plunger being at least half of the cross-sectional area of the gap between the plunger and the respective inner or outer valve seat of the first or second fluid pathway of which the opening forms a flow path when the movable plunger is in the open position may be considered a minimum requirement in order to show significant improvements in flow characteristic of the valve assembly compared to prior art arrangements.

It will be appreciated that the first fluid port and the second fluid port could be the fluid inlet and the fluid outlet, respectively, or vice versa. In other words, the presently claimed invention is not restricted by the direction of fluid flow within the valve assembly.

The advantage of having only the first fluid port and the second fluid port in the valve assembly, i.e. having only one inlet and only one outlet, is that the design of the valve assembly may be simple and compact. However, in addition to the first fluid port and the second fluid port, the valve assembly may have other fluid ports, and so the valve assembly may have multiple inlets and/or outlets in some examples. The location of the inlet(s) and outlet(s) may be various depending on the specific application of the valve assembly. The valve may be a proportional valve or a switching (i.e. ON/OFF valve). The valve may be a direct valve or a pressure compensated valve.

In one example, when the moveable plunger is in the open position, the first fluid pathway directly connects the first fluid port and the second fluid port, and the second fluid pathway, of which the fluid flow path through the body of the moveable plunger forms a part, also connects the first fluid port and the second fluid port. In this example, when the moveable plunger is in the closed position, fluid from one of the first and second fluid ports reaches the outer edge of the inner valve seat where it is prevented from passing through by the seal created by the moveable plunger, and fluid from the other of the first and second fluid ports passes through the fluid flow path through the body of the moveable plunger and reaches the outer edge of the outer valve seat where it is prevented from passing through by the seal created by the moveable plunger.

In another example, when the moveable plunger is in the open position, the second fluid pathway directly connects the first fluid port and the second fluid port, and the first fluid pathway, of which the fluid flow path through the body of the moveable plunger forms a part, also connects the first fluid port and the second fluid port. In this example, when the moveable plunger is in the closed position, fluid from one of the first and second fluid ports reaches the outer edge of the outer valve seat where it is prevented from passing through by the seal created by the moveable plunger, and fluid from the other of the first and second fluid ports passes through the fluid flow path through the body of the moveable plunger and reaches the outer edge of the inner valve seat where it is prevented from passing through by the seal created by the moveable plunger.

It may be preferable that the first fluid pathway and the second fluid pathway are the only fluid pathways between the first fluid port and the second fluid port when the movable plunger is in the open position. For example, the fluid flow as described in the two above examples may represent the only fluid pathways in the valve assembly. Thus, fluid flow is limited between said two fluid pathways and so it is easier to control. Particularly in small valves of the order of magnitude described above, having a limited number of fluid pathways allows for simplicity of the valve design, lower manufacturing costs and better manufacturability of the valves. Further, particularly in small valves of the order of magnitude described above, having a limited number of fluid pathways allows for simplicity of the fluid pathway design and better efficiency of the fluid pathway due to less direction changes of the fluid.

In some preferable arrangements, the cross-sectional area of the flow path through the opening in the moveable plunger may be at least 0.6 or 60%, 0.7 or 70%, 0.8 or 80%, 0.9 or 90%, equal to, or 100% or greater, of the cross-sectional area of the gap between the plunger and the respective inner or outer valve seat of the first or second fluid pathway of which the opening forms a flow path when the movable plunger is in the open position.

In other preferable arrangements, the cross-sectional area of the flow path through the opening in the moveable plunger may be at least two times, preferably at least 10 times, more preferably at least 50 times, the cross-sectional area of the gap between the plunger and the respective inner or outer valve seat of the first or second fluid pathway of which the opening forms a flow path when the movable plunger is in the open position. This generally defines a minimum cross sectional area of an opening through the moveable plunger, such that this defines the maximum restriction on the flow through the opening in the moveable plunger.

The greater the cross-sectional area of the opening in the moveable plunger for a fixed cross-sectional area of the gap between the plunger and the respective inner or outer valve seat of the first or second fluid pathway of which the opening forms a flow path, the higher the flow rate of fluid between the first and second fluid ports. In some particularly preferable examples, the cross-sectional area of the opening in the moveable plunger may be much higher than half of the cross-sectional area of the gap between the plunger and the respective inner or outer valve seat of the first or second fluid pathway of which the opening forms a flow path when the movable plunger is in the open position. This has the advantage of delivering a very high fluid output for a given plunger stroke length. It is preferable, for optimal valve control, that the greatest flow restriction in the flow path is represented by the maximum available opening at the valve seat, since this is that opening that is controlled to operate the valve as a flow restriction. Configuring the valve in this way provides efficient flow paths through the remaining components of the valve.

The fixed stroke of the moveable plunger may be between 0.05 mm and 1.0 mm. Preferably, the fixed stroke of the moveable plunger may be between 0.1 mm and 0.3 mm. More preferably, the fixed stroke of the moveable plunger may be 0.2 mm. Additionally or alternatively, the fixed stroke length may be less than a quarter of the diameter of the opening through the body of the moveable plunger.

In some examples, when the movable plunger is in the open position, the cross-sectional area, or the linear distance from valve seat to plunger, of the gap between the plunger and the respective inner or outer valve seat of the first or second fluid pathway of which the opening forms a flow path may be substantially equal to the cross-sectional area, or the linear distance from valve seat to plunger, of the gap between the plunger and the respective inner or outer valve seat of the first or second fluid pathway of which the opening does not form a flow path. This is typically the case when the moveable plunger seals the inner and outer valve seats across a single plane.

Alternatively, the cross-sectional area of the gap between the plunger and the respective inner or outer valve seat of the first or second fluid pathway of which the opening forms a flow path may be greater than or less than the cross-sectional area of the gap between the plunger and the respective inner or outer valve seat of the first or second fluid pathway of which the opening does not form a flow path. This may occur when the moveable plunger does not seal the inner and outer valve seats across a single plane.

Preferably, the valve assembly may further comprise a moveable diaphragm for separating a portion of the moveable plunger from the opening through the body of the moveable plunger. By "separating", it is meant that the moveable plunger is positioned such that there is no direct fluid pathway from said portion of the moveable plunger and the opening through the body of the moveable plunger. The valve assembly may further comprise pressure compensation means for ensuring that the fluid inlet and a portion of the moveable plunger that is not in a direct flow path between the first and second fluid ports are under substantially the same pressure when the moveable plunger is in the closed position. Advantageously, this means that the moveable plunger may be kept from moving to its open position unintentionally.

The pressure compensation means may be a pressure equalising fluid pathway from the first fluid port or the second fluid port to a portion of the moveable plunger that is not in a direct flow path between the first fluid port and the second fluid port. The pressure equalising pathway usually extends from the fluid port that is a fluid inlet to a portion of the moveable plunger that is not in a direct flow path between both the fluid inlet and the fluid outlet or is at least not in a direct flow path between them. This is because the fluid inlet is usually at a higher pressure than the fluid outlet.

The valve assembly may further comprise a shim for varying the area of the moveable diaphragm that can be biased by pressure from the first fluid port or the second fluid port. This advantageously provides a flexible approach to varying the pressure that is exerted on the portion of the moveable plunger that is not in a direct flow path between the first and second fluid ports.

Preferably, the valve assembly may further comprise actuating means for actuating the moveable plunger, in use, between the first position and the second position. The actuating means may comprise a solenoid that actuates the moveable plunger upon the application of a current through the solenoid. In this case, the moveable plunger may comprise or consist of a magnetic material.

In such electrically actuated solenoid valve assemblies, an electric current may be applied through the solenoid which energises it, and the magnetic field that is created as a result controls the movement of the magnetic plunger that opens and closes the valve, thus allowing or preventing fluid from flowing through the valve. When the solenoid is energised, the plunger may overcome the force of a spring that holds the plunger in a normally open or normally closed position and be accelerated towards or away from a valve seat. A hold voltage may be applied to the solenoid in order to advance the movement of the plunger towards or away from the valve seat and/or to retain the valve in a closed or open position. Sometimes, a braking voltage may also be applied in order to brake the movement of the plunger so as to lessen its impact upon the valve seat.

By way of comparison to these solenoid actuated valve assemblies, valve assemblies employing other actuator technology may display the following disadvantages. A voice coil may be more expensive, create less force and have a larger size. A shape-memory allow (SMA) may have a slower response time and have a larger size, in particular height-wise.

In preferable examples of the present invention, the inner valve seat and the outer valve seat are arranged concentrically. A concentric design provides the advantage of being compact and optimising the use of space within the valve assembly, which may be limited, for example, in a small valve assembly such as a microfluidic valve assembly.

According to a second aspect of the invention, there is provided a valve system, comprising at least two valve assemblies of any preceding claim, wherein the distance between adjacent valve assemblies is less than 50 mm, preferably less than 40 mm, more preferably less than 20 mm.

The advantages described above in relation to a single valve assembly also equally apply to the valve system.

BRIEF DESCRIPTION OF THE DRAWINGS

Embodiments of the present invention will now be described, by non-limiting example only, with reference to the accompanying drawings, in which.

DETAILED DESCRIPTION OF EMBODIMENTS

The following detailed description and figures provide examples of how the present invention can be implemented and should not be seen as limiting examples, rather illustrations of how the various features of the valve assembly disclosed herein can be combined, although other optional combinations will be evident upon reading the following description in light of the figures.

Figure 1:
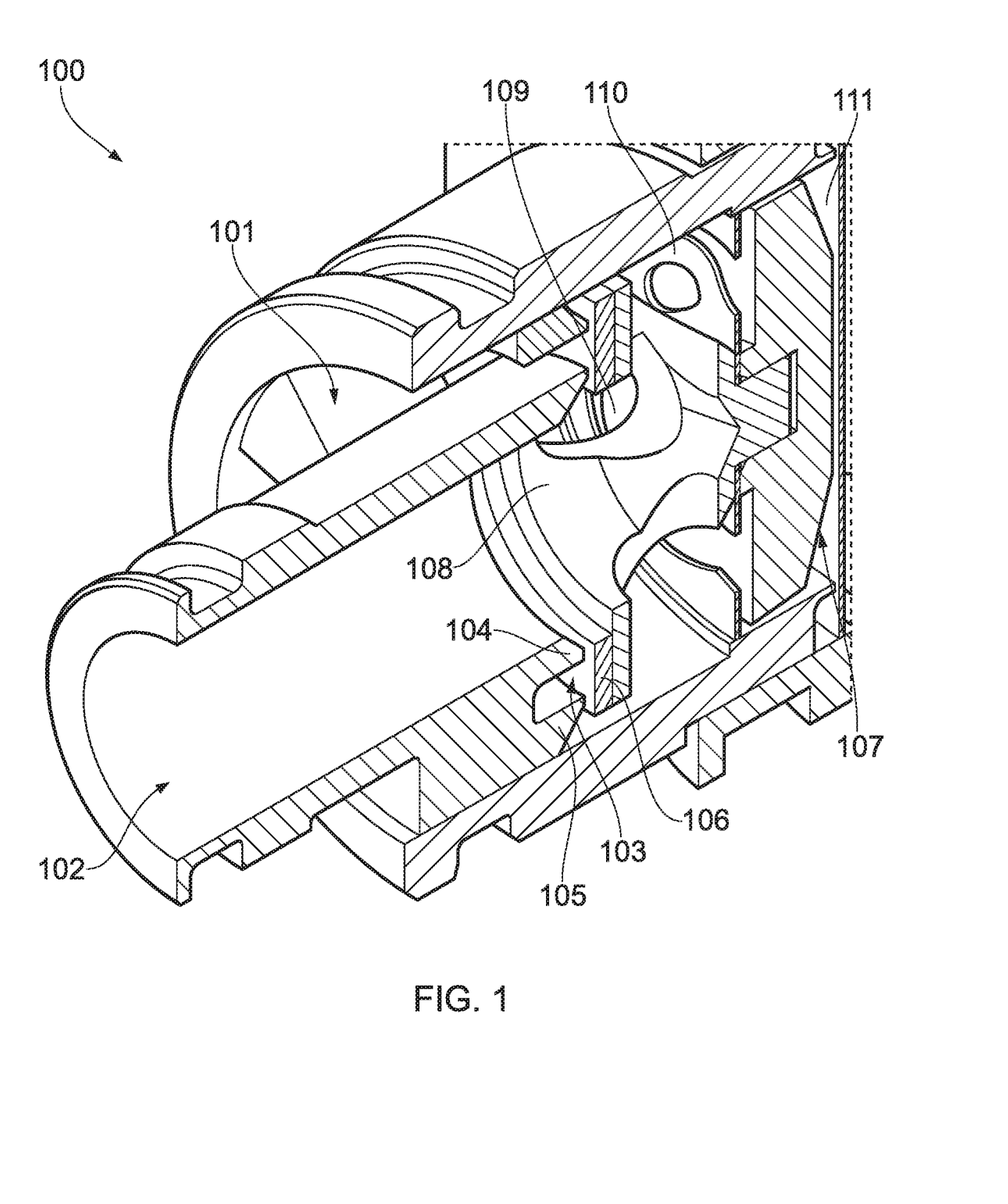
FIG. 1 shows an isometric cross-sectional view of a valve assembly in accordance with a first embodiment of the present invention.
Figure 2:
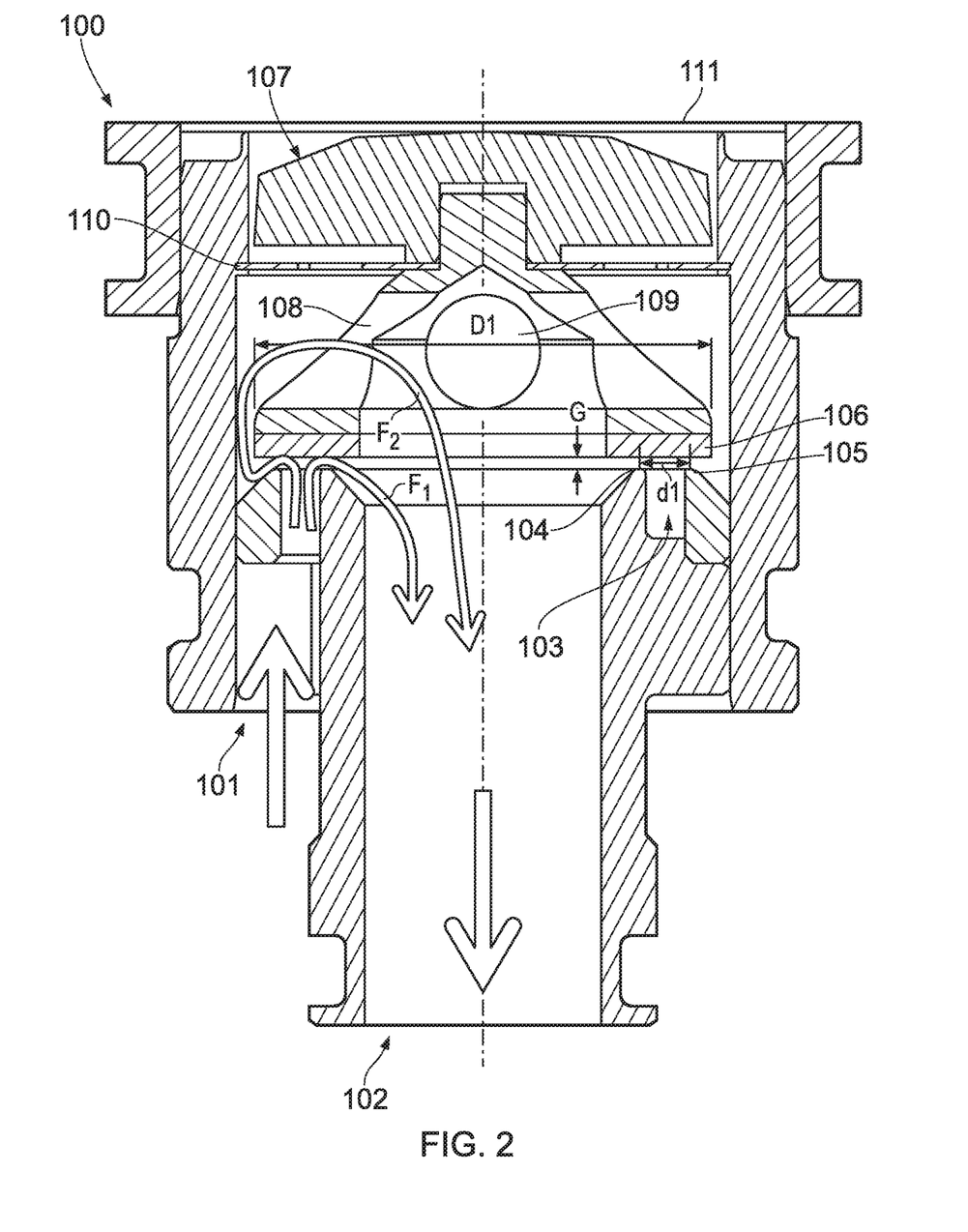
FIG. 2 shows an orthogonal cross-sectional view of a valve assembly in its open position in accordance with the first embodiment of the present invention.
Figure 3:
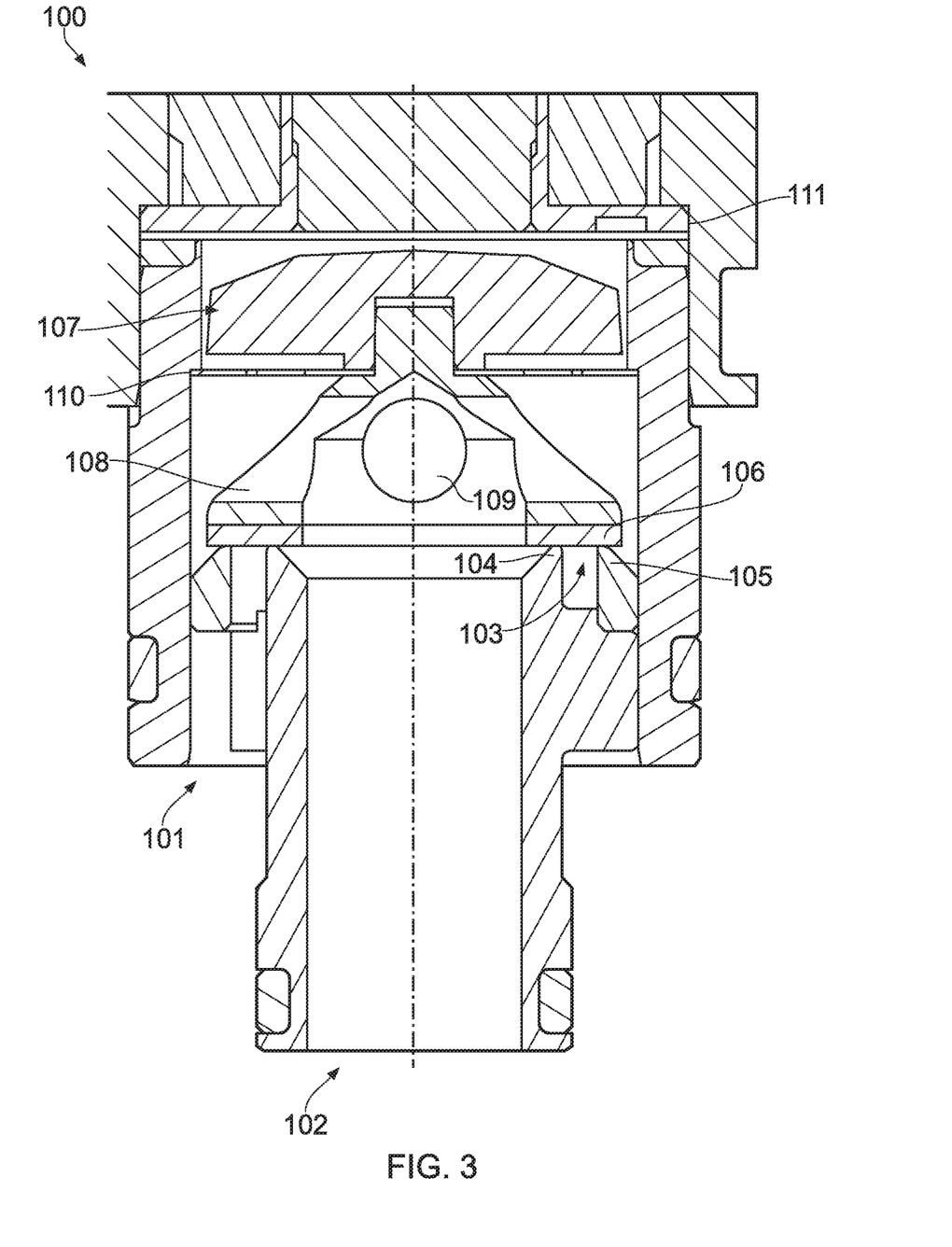
FIG. 3 shows an orthogonal cross-sectional view of a valve assembly in its closed position in accordance with the first embodiment of the present invention.

In FIGS. 1, 2 and 3, a valve assembly 100 according to a first embodiment of the present invention is shown, FIG. 1 being an isometric cross-sectional view and FIGS. 2 and 3 being orthogonal cross-sectional views. FIGS. 1 and 3 show the valve assembly in its closed position where FIG. 2 shows the valve assembly in its open position. The diameter of the valve assembly 100 of the illustrated example is about 16 mm, but other examples may be larger or smaller.

The valve assembly 100 comprises a first fluid port 101 and a second fluid port 102. In this embodiment, the first fluid port 101 is the fluid inlet and the second fluid port 102 is the fluid outlet. However, it will be appreciated that in other embodiments, the first fluid port could be the fluid outlet and the second fluid port could be the fluid inlet. The direction of fluid flow is shown by the arrows in FIG. 2.

The valve assembly 100 further comprises a valve seat 103 comprising an inner valve seat 104 and an outer valve seat 105 in a concentric arrangement, the inner valve seat 104 being arranged within the outer valve seat 105, and a valve seal 106. The assembly further comprises a moveable plunger 107 comprising an upper magnetic portion and a body 108 having an opening 109. A biasing means, preferably in the form of a spring 110 can also be provided, as can a non-moveable insulating membrane 111 for preventing fluid from coming into contact with a solenoid (not shown in FIG. 1) of the valve assembly 100.

The moveable plunger 107 is moveable between a closed position and an open position to vary a flow restriction at the valve seat and is preferably arranged to simultaneously seal the inner valve seat 104 and the outer valve seat 105. In FIG. 2, it can be seen that, in certain preferred embodiments, a largest diameter D1 of the moveable plunger 107 can be around 10.2 mm, and a radial distance d1 between the inner valve seat 104 and the outer valve seat 105 may be 0.9 mm. The overall stroke length of the moveable plunger 107 may be about 0.2 mm.

A first fluid pathway $F_1$ is arranged between the first fluid port 101 and the second fluid port 102, passing via the inner valve seat 104 (i.e. between the inner valve seat 104 and the valve seal 106) when the moveable plunger 107 is in the open position. A second fluid pathway $F_2$ is arranged between the first fluid port 101 and the second fluid port 102, passing via the outer valve seat 105 (i.e. between the outer valve seat 105 and the valve seal 106), when the moveable plunger 107 is in the open position. Further, a fluid flow path through the body 108 of the moveable plunger 107 comprising the opening 109 is configured to form part of the second fluid pathway $F_2$. The cross-sectional area of the flow path through the moveable plunger 107, i.e. the minimum cross-sectional area, orthogonal to the flow direction, through which the fluid flow has to flow on the flow path through the moveable plunger 107, is at least approximately 50 times the cross-sectional area of the gap between the plunger and the outer valve seat 105 when the moveable plunger 107 is in the open position. However, in other embodiments, this proportion may be as low as half of the cross-sectional area of the gap between the plunger and the outer valve seat 105. The flow path through the moveable plunger 107 is on the second fluid pathway $F_2$ of which the opening 109 forms a part.

As shown in FIG. 2, the depth G of the gap (or linear distance) between the plunger and the outer valve seat 105 of the second fluid pathway, of which the opening 109 forms a flow path, is substantially equal to the depth G of the gap (or linear distance) between the plunger and the inner valve seat 104 of the first fluid pathway, of which the opening 109 does not form a flow path. In other words, the moveable plunger 107 seals the inner and outer valve seats 104, 105 across a single plane.

In the open position shown in FIG. 2, fluid enters the valve assembly 100 through the first fluid port 101 and is able to flow via two paths. The first fluid pathway Fi directly connects the first fluid port 101 and the second fluid port 102, and the second fluid pathway $F_2$, of which a fluid flow path or opening 109 through the body 108 of the moveable plunger 107 forms a part, also connects the first fluid port 101 and the second fluid port 102. The first fluid pathway and the second fluid pathway are, in preferred embodiments, the only fluid pathways between the first fluid port 101 and the second fluid port 102 when the moveable plunger is in the open position.

In this embodiment, when the moveable plunger 107 is in the closed position, as shown in FIGS. 1 and 3, fluid from the second fluid port 102 reaches the outer edge of the inner valve seat 104 where it is prevented from passing through by the valve seal 106 created by the moveable plunger 107. Fluid from the first fluid port 101 can extend through the fluid flow path or opening 109 through the body 108 of the moveable plunger 107 and can reach the outer edge of the outer valve seat 105, where it is prevented from passing through by the valve seal 106 created by the moveable plunger 107. In this embodiment, the valve seal 106 is a seal made of a compliant material such as rubber, although any suitable sealant material can be used, be it of a compliant nature or not.

In the electrically actuated solenoid valve of FIGS. 1, 2 and 3, an upper portion of the moveable plunger 107 is made of a magnetic material. Thus, when an electric current is applied through the solenoid, the solenoid is energised and the magnetic field that is created as a result controls the movement of the magnetic moveable plunger 107 that opens and closes the valve, thus allowing or preventing fluid from flowing through the valve. When the solenoid is energised, the plunger may overcome the force of the spring 110 that holds the plunger in a normally closed position and be accelerated away from the valve seat 103. It will be appreciated that in other embodiments, the valve assembly may be a normally open valve assembly and so energisation of the solenoid causes the plunger to overcome the force of the spring that holds the plunger in a normally open position, such that it is accelerated towards the valve seat. In this embodiment, the spring 110 is a flat spring, although other biasing means may be employed to provide the function of the spring described above.

The non-moveable insulating membrane 111 is preferably provided above the moveable plunger 107, as shown in FIGS. 1, 2 and 3. The non-moveable insulating membrane 111 acts to isolate a portion of the moveable plunger 107 from the flow path through the body of the moveable plunger 107, in particular to prevent fluid from coming into contact with a solenoid (not shown in FIGS. 1, 2 and 3) of the valve assembly 100.

Figure 4:
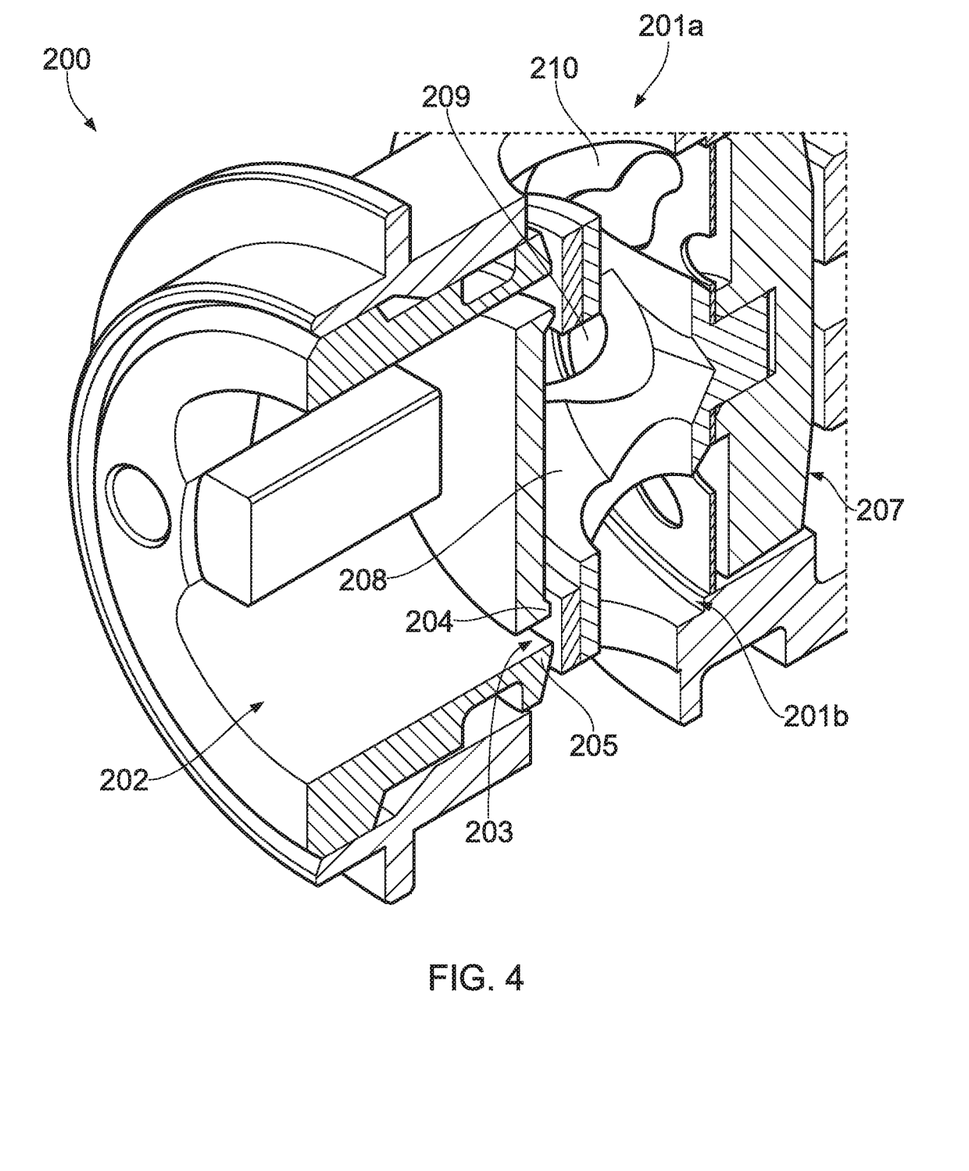
FIG. 4 shows an isometric cross-sectional view of a valve assembly in accordance with a second embodiment of the present invention.
Figure 5:
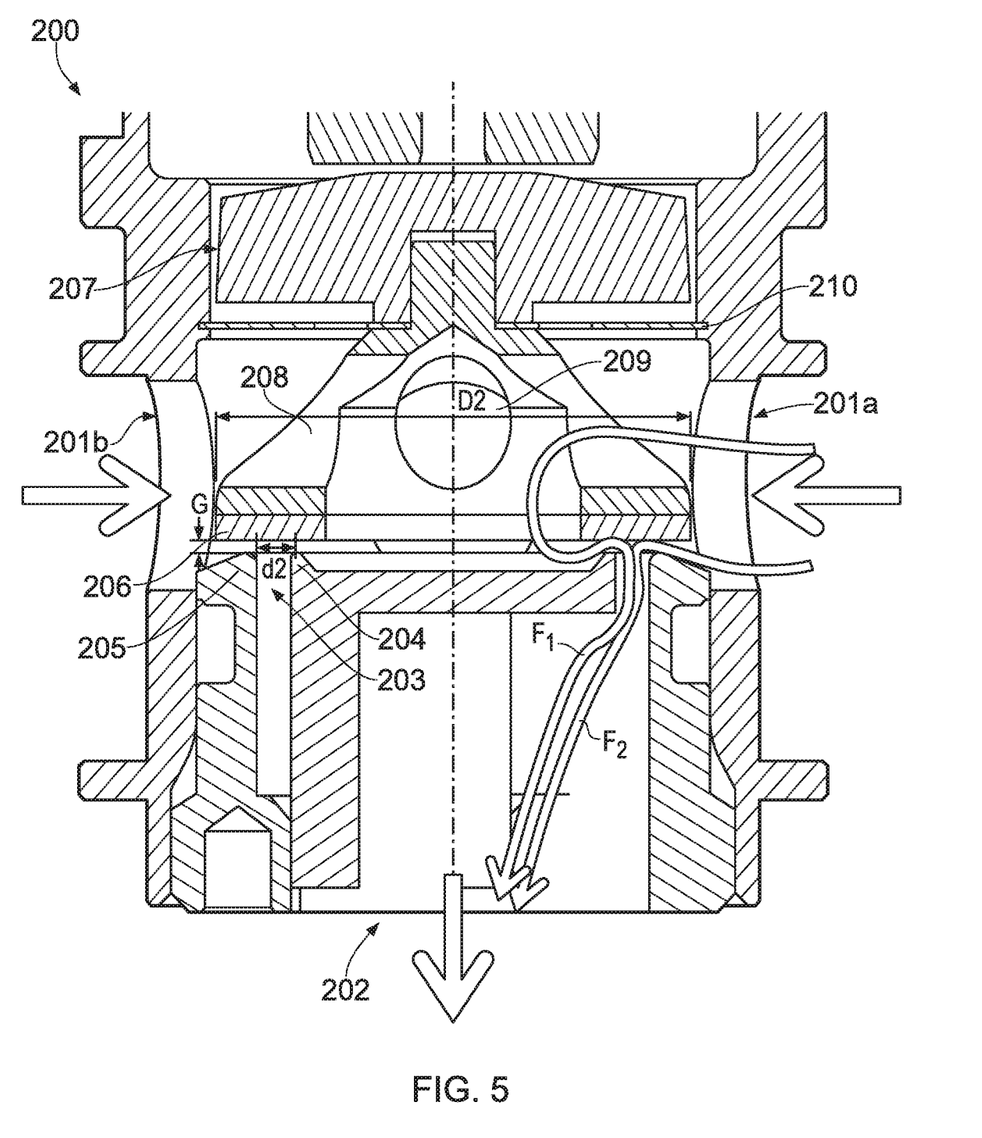
FIG. 5 shows an orthogonal cross-sectional view of a valve assembly in its open position in accordance with the second embodiment of the present invention.
Figure 6:
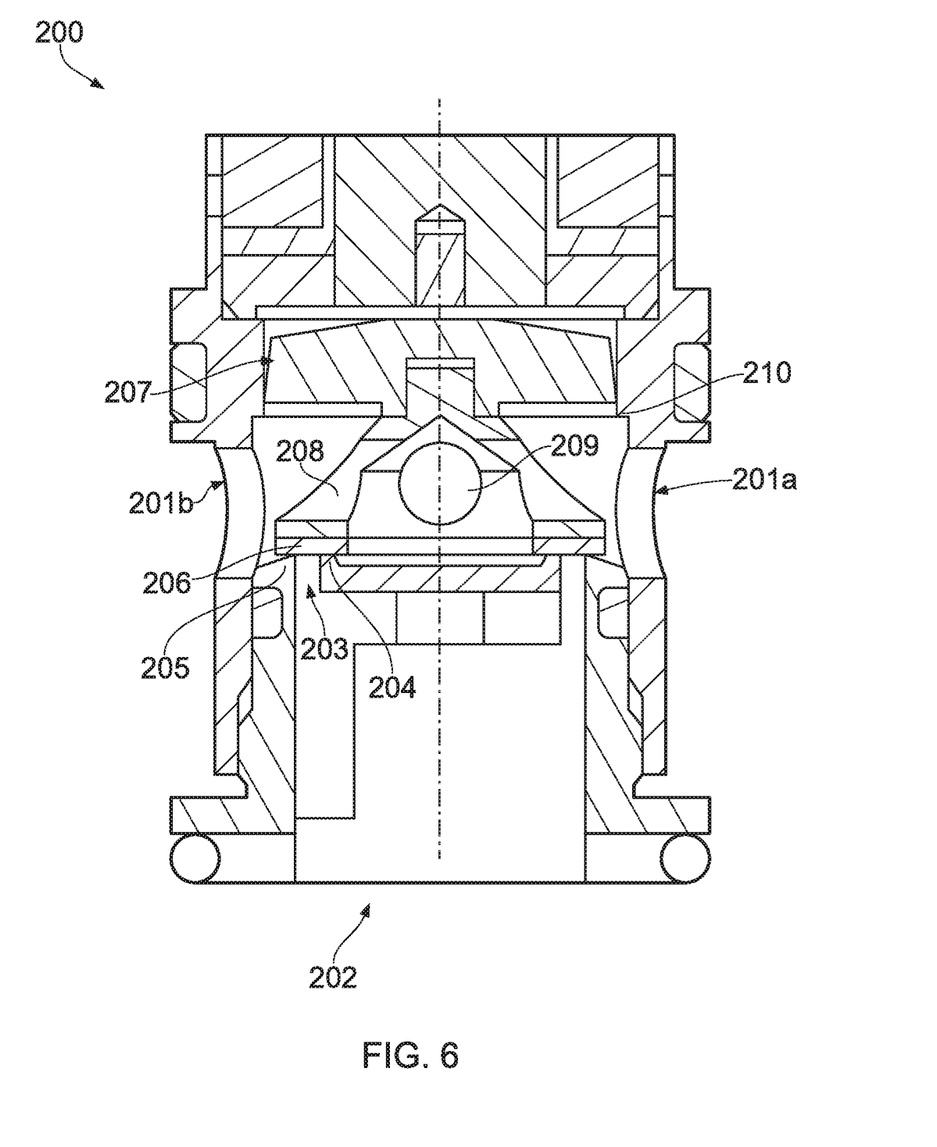
FIG. 6 shows an orthogonal cross-sectional view of a valve assembly in its closed position in accordance with the second embodiment of the present invention.

In FIGS. 4, 5 and 6, a valve assembly 200 according to a second embodiment of the present invention is shown, FIG. 6 being an isometric cross-sectional view and FIGS. 5 and 6 being orthogonal cross-sectional views. FIGS. 4 and 6 show the valve assembly in its closed position; FIG. 5 shows the valve assembly in its open position. The diameter of the valve assembly 200 is, in preferred examples, about 16 mm.

The valve assembly 200 comprises a first fluid port 201a, a second fluid port 202 and a third fluid port 201b. In this embodiment, the first fluid port 201a and the third fluid port 201b are the fluid inlets, and the second fluid port 202 is the fluid outlet. However, it will be appreciated that in other embodiments, the first fluid port and the third fluid port could be fluid outlets and the second fluid port could be a fluid inlet. The direction of fluid flow is shown by the arrows in FIG. 5. It can be seen from FIG. 7 that although there are three fluid ports in the second embodiment of the present invention, there are only two fluid pathways, and these will be described in further detail below.

The valve assembly 200 further comprises a valve seat 203 comprising an inner valve seat 204 and an outer valve seat 205 in a concentric arrangement, the inner valve seat 204 being arranged within the outer valve seat 205 and a valve seal 206. The assembly further comprises a moveable plunger 207 comprising an upper magnetic portion and a body 208 having an opening 209. A biasing means, preferably in the form of a spring 210 can also be provided, as can a moveable diaphragm 211.

The moveable plunger 207 is moveable between a closed position and an open position to vary a flow restriction at the valve seat and is preferably arranged to simultaneously seal the inner valve seat 204 and the outer valve seat 205. Referring to FIG. 5, it can be seen that a largest diameter D2 of the moveable plunger 207 can be around 10.2 mm and a radial distance d2 between the inner valve seat 104 and the outer valve seat 205 can be around 0.8 mm. The stroke length of the moveable plunger 207 is, in preferred embodiments, about 0.2 mm.

A first fluid pathway $F_1$ is arranged between the first or third fluid ports 201a, 201b and the second fluid port 202, passing via the inner valve seat 204 (i.e. between the inner valve seat 204 and the valve seal 206) when the moveable plunger 207 is in the open position. A second fluid pathway $F_2$ is arranged between the first or third fluid ports 201a, 201b and the second fluid port 202 passing via the outer valve seat 205 (i.e. between the outer valve seat 205 and the valve seal 206) when the moveable plunger 207 is in the open position. Further, a fluid flow path through the body 208 of the moveable plunger 207 comprising the opening 209 is configured to form part of the first fluid pathway $F_1$. The cross-sectional area of the flow path through the moveable plunger 207, i.e. the minimum cross-sectional area, orthogonal to the flow direction, through which the fluid flow has to flow on the flow path through the moveable plunger 207, is at least approximately 50 times the cross-sectional area of the gap between the plunger and the inner valve seat 204 when the moveable plunger 207 is in the open position. However, in other embodiments, this proportion may be as low as half of the cross-sectional area of the gap between the plunger and the inner valve seat 204. The flow path through the moveable plunger 207 is on the first fluid pathway $F_1$ of which the opening 109 forms a part.

As shown in FIG. 5, the depth G (or linear distance) of the gap between the plunger and the inner valve seat 204 of the second fluid pathway of which the opening 209 forms a flow path is substantially equal to the depth G (or linear distance) of the gap between the plunger and the outer valve seat 205 of the first fluid pathway of which the opening 209 does not form a flow path. In other words, the moveable plunger 207 seals the inner and outer valve seats 204, 205 across a single plane.

In the open position shown in FIG. 5, fluid enters the valve assembly 200 through the first fluid port 201a and the third fluid port 201b and is able to flow via two paths. The second fluid pathway $F_2$ directly connects the first and third fluid ports 201a, 201b and the second fluid port 202, and the first fluid pathway $F_1$, of which the fluid flow path or opening 209 through the body 208 of the moveable plunger 207 forms a part, also connects the first and third fluid ports 201a, 201b and the second fluid port 202. The first fluid pathway and the second fluid pathway, in preferred embodiments, are the only fluid pathways between the first and third fluid ports 201a, 201b and the second fluid port 202 when the moveable plunger is in the open position.

In this embodiment, when the moveable plunger 207 is in the closed position, as shown in FIGS. 4 and 6, fluid from the first and third fluid ports 201a, 201b can extend through the fluid flow path or opening 209 through the body 208 of the moveable plunger 207 and reaches the outer edge of the inner valve seat 204 where it is prevented from passing through by the valve seal 206 created by the moveable plunger 207. Fluid from the second fluid port 202 can reach the outer edge of the outer valve seat 205 where it is prevented from passing through by the valve seal 206 created by the moveable plunger 207. In this embodiment, the valve seal 206 is a seal made of a compliant material such as rubber, although any suitable sealant material can be used, be it of a compliant nature or not.

In the electrically actuated solenoid valve of FIGS. 4, 5 and 6, an upper portion of the moveable plunger 207 is made of a magnetic material. Thus, when an electric current is applied through the solenoid, the solenoid is energised and the magnetic field that is created as a result controls the movement of the magnetic moveable plunger 107 that opens and closes the valve, thus allowing or preventing fluid from flowing through the valve. When the solenoid is energised, the plunger may overcome the force of the spring 210 that holds the plunger in a normally closed position and be accelerated away from the valve seat 203. It will be appreciated that in other embodiments, the valve assembly may be a normally open valve assembly and so energisation of the solenoid causes the plunger to overcome the force of the spring that holds the plunger in a normally open position such that it is accelerated towards the valve seat. In this embodiment, the spring 210 is a flat spring, although other biasing means may be employed to provide the function of the spring described above.

Figure 7:
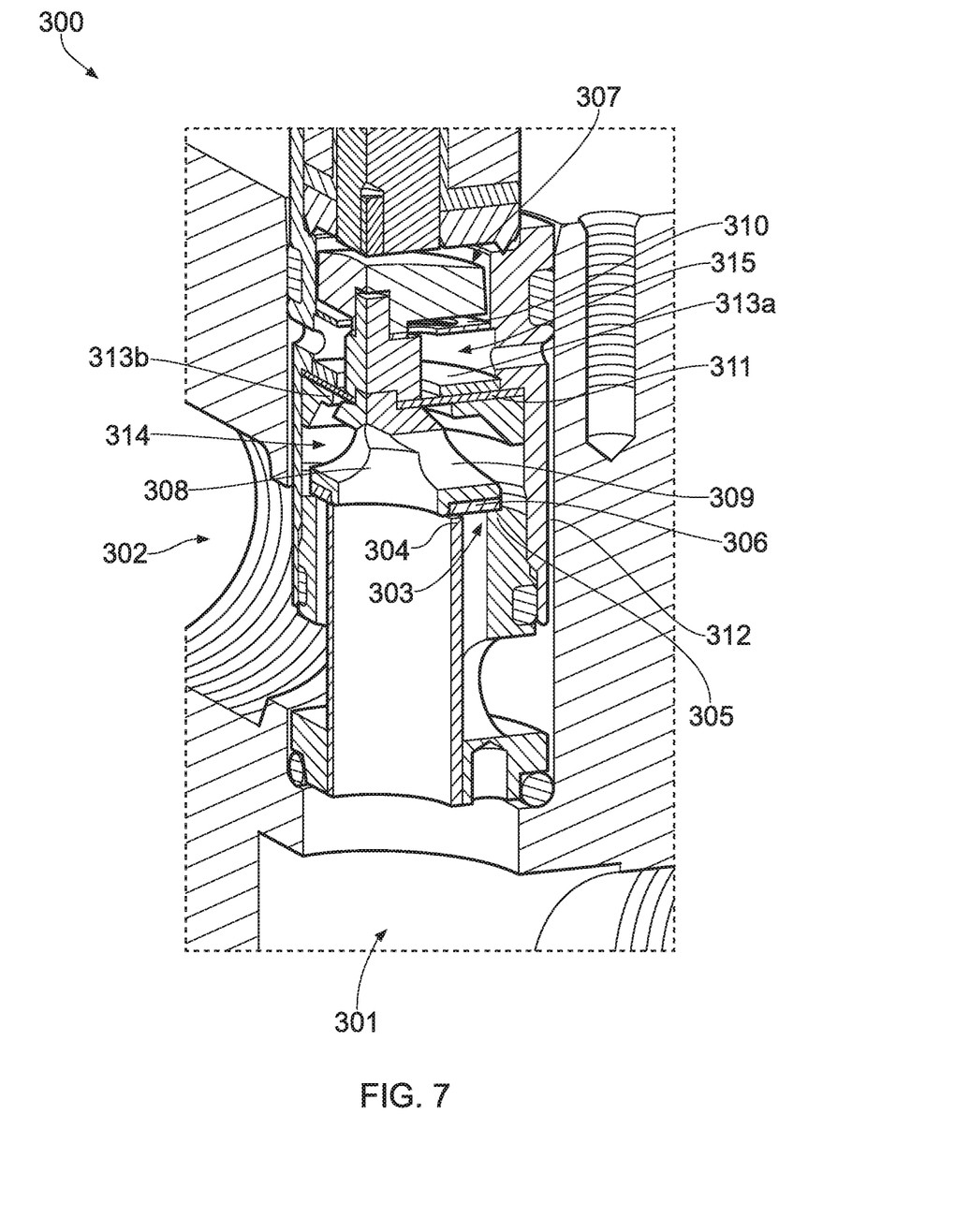
FIG. 7 shows a schematic view of a valve assembly in accordance with a third embodiment of the present invention.

In FIG. 7, a schematic (upright) sectional view of a valve assembly 300 in its closed position according to a third embodiment of the present invention is shown.

The valve assembly 300 comprises a first fluid port 301 and a second fluid port 302. In this embodiment, the first fluid port 301 is the fluid inlet and the second fluid port 302 is the fluid outlet. However, it will be appreciated that in other embodiments, the first fluid port could be the fluid outlet, and the second fluid port could be the fluid inlet.

The valve assembly 300 further comprises a valve seat 303 comprising an inner valve seat 304 and an outer valve seat 305 in a concentric arrangement, the inner valve seat 304 being arranged within the outer valve seat 305 and a valve seal 306. The assembly further comprises a moveable plunger 307 comprising an upper magnetic portion and a body 308 having an opening 309 (not visible in the schematic view of FIG. 7). A biasing means, preferably in the form of a spring 310 can also be provided, as can a moveable diaphragm 311, a pressure equalising fluid pathway 312, an upper shim 313a and a lower shim 313b.

The pressure equalising fluid pathway 312 is a pressure compensation means for ensuring that the fluid inlet and a portion of the moveable plunger that is not in a direct flow path between the first and second fluid ports are under substantially the same pressure when the moveable plunger is in the closed position. In other words, fluid flow between the first and second fluid ports is prevented in this portion of the moveable plunger. Advantageously, this means that the moveable plunger may be kept from moving to its open position unintentionally.

The pressure equalising fluid pathway 312 extends from the second fluid port 302, the fluid inlet in this case, to a portion of the moveable plunger that is not in a direct flow path between the first fluid port 301 and the second fluid port 302. In other embodiments, the pressure equalising fluid pathway can extend from the first fluid port to a portion of the moveable plunger that is not in a direct flow path between the first fluid port and the second fluid port.

The upper shim 313a is for varying the area of the moveable diaphragm 311 that can be biased by pressure from the first fluid port 301. Pressure within a valve chamber 314 can cause the moveable diaphragm 311 to be biased outwardly from the valve chamber 314. Varying the inner diameter of the opening in the upper shim 313a can therefore vary the amount of biasing of the moveable diaphragm 311 outwardly from the valve chamber 314.

The lower shim 313b is for varying the area of the moveable diaphragm 311 that can be biased by pressure from the second fluid port 302. Pressure within a pressure compensating chamber 315 can cause the moveable diaphragm 311 to be biased outwardly from the pressure compensating chamber 315. Varying the inner diameter of the opening in the upper shim 313a can therefore vary the amount of biasing of the moveable diaphragm 311 outwardly from the pressure compensating chamber 315.

Thus, different diameters of the upper shim 313a and lower shim 313b can vary the amount of pressure exerted by the valve chamber 314 and the pressure compensating chamber 315 upon the moveable diaphragm, respectively.

The upwards pressure on the valve seal 306 is compensated by the downwards pressure on the moveable plunger 307 from the fluid inlet via the pressure equalising fluid pathway 312. This advantageously provides a flexible approach to varying the pressure that is exerted on the portion of the moveable plunger 307 that is not in a direct flow path between the first and second fluid ports 301, 302.

Figure 8:
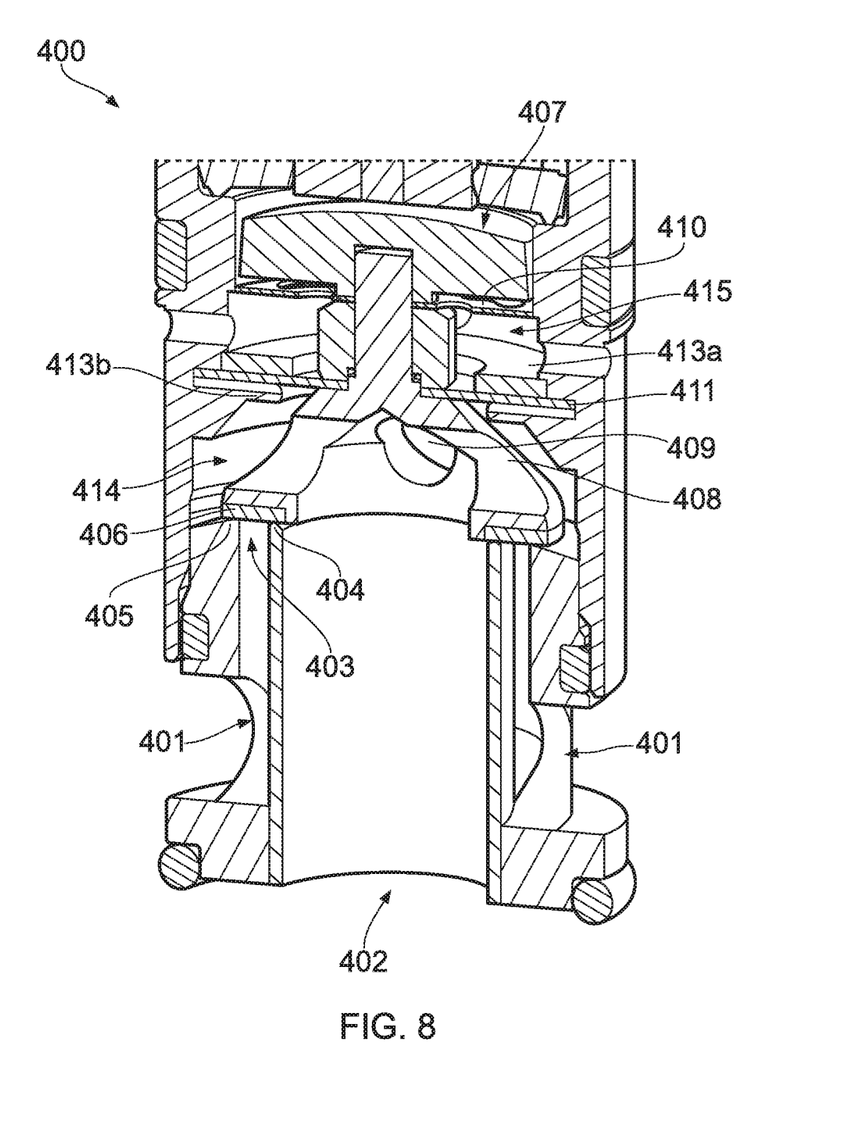
FIG. 8 shows a schematic view of a valve assembly in accordance with a fourth embodiment of the present invention.

In FIG. 8, a schematic (upright) view of valve assembly 400 in its closed position according to a fourth embodiment of the present invention is shown.

The valve assembly 400 comprises a first fluid port 401 and a second fluid port 402. In this embodiment, the first fluid port 401 is the fluid inlet and the second fluid port 402 is the fluid outlet. However, it will be appreciated that in other embodiments, the first fluid port could be the fluid outlet, and the second fluid port could be the fluid inlet.

The valve assembly 400 further comprises a valve seat 403 comprising an inner valve seat 404 and an outer valve seat 405 in a concentric arrangement, the inner valve seat 404 being arranged within the outer valve seat 405 and a valve seal 406. The assembly further comprises a moveable plunger 407 comprising an upper magnetic portion and a body 408 having an opening 409. A biasing means, preferably in the form of a spring 410 can also be provided, as can a moveable diaphragm 411, a pressure equalising fluid pathway (not visible in the schematic view of FIG. 8), an upper shim 413a and a lower shim 413b.

As with the third embodiment described above in relation to FIG. 7, the pressure equalising fluid pathway is a pressure compensation means for ensuring that the fluid inlet and a portion of the moveable plunger that is not in a direct flow path between the first and second fluid ports are under substantially the same pressure when the moveable plunger is in the closed position. It extends from the first fluid port 401, the fluid inlet in this case, to a portion of the moveable plunger that is not in a direct flow path between the first fluid port 401 and the second fluid port 402.

The upper shim 413a is for varying the area of the moveable diaphragm 411 that can be biased by pressure from the first fluid port 301. Pressure within a valve chamber 414 can cause the moveable diaphragm 411 to be biased outwardly from the valve chamber 414. Varying the inner diameter of the opening in the upper shim 413a can therefore vary the amount of biasing of the moveable diaphragm 411 outwardly from the valve chamber 414.

The lower shim 413b is for varying the area of the moveable diaphragm 411 that can be biased by pressure from the second fluid port 402. Pressure within the pressure compensating chamber 315 can cause the moveable diaphragm 411 to be biased outwardly from a pressure compensating chamber 415. Varying the inner diameter of the opening in the upper shim 413a can therefore vary the amount of biasing of the moveable diaphragm 411 outwardly from the pressure compensating chamber 415.

Thus, different diameters of the upper shim 413a and lower shim 413b can vary the amount of pressure exerted by the valve chamber 414 and the pressure compensating chamber 415 upon the moveable diaphragm, respectively.

The upwards pressure on the valve seal 406 is compensated by the downwards pressure on the moveable plunger 407 from the fluid inlet via the pressure equalising fluid pathway. This advantageously provides a flexible approach to varying the pressure that is exerted on the portion of the moveable plunger 407 that is not in a direct flow path between the first and second fluid ports 401, 402.

The above description relates to four particularly preferred aspects of the invention, but it will be appreciated that other implementations are possible. Variations and modifications will be apparent to the skilled person, such as equivalent and other features which are already known and which may be used instead of, or in addition to, features described herein. Features that are described in the context of separate aspects or embodiments may be provided in combination in a single aspect or embodiment. Conversely, features which are described in the context of a single aspect or embodiment may also be provided separately or in any suitable sub-combination.

| | |
|---|---|
| 100, 200, 300, 400 | Valve assembly |
| 101, 201a, 301, 401 | First fluid port |
| 102, 202, 302, 402 | Second fluid port |
| 201b | Third fluid port |
| 103, 203, 303, 403 | Valve seat |
| 104, 204, 304, 404 | Inner valve seat |
| 105, 205, 305, 405 | Outer valve seat |
| 106, 206, 306, 406 | Valve seal |
| 107, 207, 307, 407 | Moveable plunger |
| 108, 208, 308, 408 | Moveable plunger body |
| 109, 209, 309, 409 | Opening |
| 110, 210, 310, 410 | Spring |
| 111 | Non-moveable insulating membrane |
| 311, 411 | Moveable diaphragm |
| 312 | Pressure equalising fluid pathway |
| 313a, 413a | Upper shim |
| 313b, 413b | Lower shim |
| 314, 414 | Valve chamber |
| 315, 415 | Pressure compensating chamber |

The invention claimed is:

1. A valve assembly, comprising:
   a first fluid port;
   a second fluid port;
   a valve seat comprising an inner valve seat and an outer valve seat, the inner valve seat being arranged within the outer valve seat;
   a moveable plunger, having a body and being moveable between a closed position, wherein the inner valve seat and the outer valve seat are closed, and an open position, wherein the inner valve seat and the outer valve seat are open, to vary a flow restriction at the valve seat, and arranged to simultaneously open and close the inner valve seat and the outer valve seat when moving between the closed position and the open position;
   a first fluid pathway between the first fluid port and the second fluid port passing via the inner valve seat and the outer valve seat when the moveable plunger is in the open position;
   a second fluid pathway between the first fluid port and the second fluid port passing via the outer valve seat when the movable plunger is in the open position;
   at least one fluid flow path through the body of the moveable plunger comprising an opening configured to form part of the first fluid pathway or the second fluid pathway, and wherein a cross-sectional area of the flow path through the moveable plunger is at least half of a cylindrical cross-sectional area spanned by a gap between the plunger and the respective inner or outer valve seat of the first or second fluid pathway of which the opening forms a flow path when the movable plunger is in the open position;
   a diaphragm connected to and moveable with the plunger for fluidically separating a portion of the moveable plunger from the flow path through the body of the moveable plunger; and
   a pressure equalizing fluid pathway from one of the first fluid port and the second fluid port to the portion of the moveable plunger that is fluidically separated from the flow path through the body of the movable plunger by the diagram.

2. The valve assembly according to claim 1, wherein the cross-sectional area of the flow path through the opening in the moveable plunger is at least 60%, 70%, 80%, 90%, 100%, or greater, of the cross-sectional area spanned by the gap between the plunger and the respective inner or outer valve seat of the first or second fluid pathway of which the opening forms a flow path when the movable plunger is in the open position.

3. The valve assembly according to claim 1, wherein the cross-sectional area of the flow path through the opening in the moveable plunger is at least two times, preferably at least 10 times, more preferably at least 50 times, the cross-sectional area spanned by the gap between the plunger and the respective inner or outer valve seat of the first or second fluid pathway of which the opening forms a flow path when the movable plunger is in the open position.

4. The valve assembly according to claim 1, wherein when the movable plunger is in the open position, the linear distance of the gap between the plunger and the respective inner or outer valve seat of the first or second fluid pathway of which the opening forms a flow path is substantially equal to the linear distance of the gap between the plunger and the respective inner or outer valve seat of the first or second fluid pathway of which the opening does not form a flow path.

5. The valve assembly according to claim 1, wherein the first fluid pathway and the second fluid pathway are the only fluid pathways between the first fluid port and the second fluid port when the movable plunger is in the open position.

6. The valve assembly according to claim 1, wherein the pressure equalizing pathway extends from the fluid inlet to a portion of the moveable plunger that is not in a direct flow path between the fluid inlet and the fluid outlet.

7. The valve assembly according to claim 6, wherein the valve assembly further comprises a shim for varying the area of the diaphragm that can be biased by pressure from the first fluid port or the second fluid port.

8. The valve assembly according to claim 1, wherein the valve assembly further comprises actuating means for actuating the moveable plunger, in use, between the first position and the second position.

9. The valve assembly according to claim 8, wherein the actuating means comprises a solenoid that actuates the moveable plunger upon the application of a current through the solenoid.

10. The valve assembly according to claim 1, wherein the inner valve seat and the outer valve seat are arranged concentrically.

11. The valve assembly according to claim 1, wherein the moveable plunger has a stroke of between 0.05 mm and 1.0 mm.

12. The valve system, comprising at least two valve assemblies of claim 1, wherein the distance between adjacent valve assemblies is less than 50 mm, preferably less than 40 mm, more preferably less than 22 mm.

13. A valve assembly, comprising:
   a first fluid port;
   a second fluid port;
   a valve seat comprising an inner valve seat and an outer valve seat;
   a moveable plunger, having a body and being moveable between a closed position, wherein the inner valve seat and the outer valve seat are closed, and an open position, wherein the inner valve seat and the outer valve seat are open, to vary a flow restriction at the valve seat, and arranged to simultaneously open and close the inner valve seat and the outer valve seat when moving between the closed position and the open position;
   a first fluid pathway between the first fluid port and the second fluid port passing via the inner valve seat and the outer valve seat when the movable plunger is in the open position;
   a second fluid pathway between the first fluid port and the second fluid port passing via the outer valve seat when the movable plunger is in the open position; and
   at least one fluid flow path through the body of the moveable plunger comprising an opening configured to form part of the first fluid pathway or the second fluid pathway.

14. The valve assembly according to claim 13, wherein a cross-sectional area of the flow path through the moveable plunger is at least half of a cylindrical cross-sectional area spanned by a gap between the plunger and the respective inner or outer valve seat of the first or second fluid pathway of which the opening forms a flow path when the movable plunger is in the open position.

15. The valve assembly according to claim 13, further comprising:
   a diaphragm connected to and moveable with the plunger for fluidically separating a portion of the moveable plunger from the flow path through the body of the moveable plunger.

16. The valve assembly according to claim 15, further comprising:
   a pressure equalizing fluid pathway from one of the first fluid port and the second fluid port to the portion of the moveable plunger that is fluidically separated from the flow path through the body of the movable plunger by the movable diagram.

* * * * *